Aug. 19, 1952   F. A. LAMBACH   2,607,153
FISH BOBBER
Filed Oct. 19, 1950
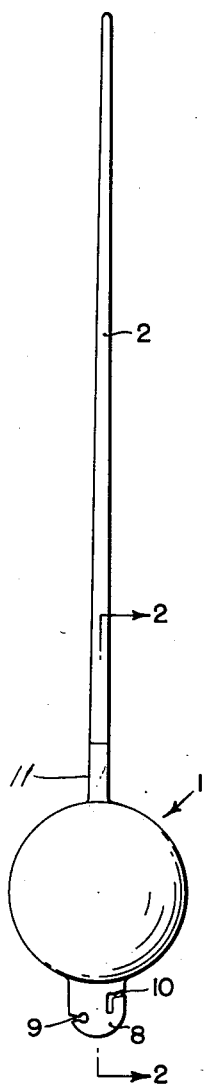
FIG. I
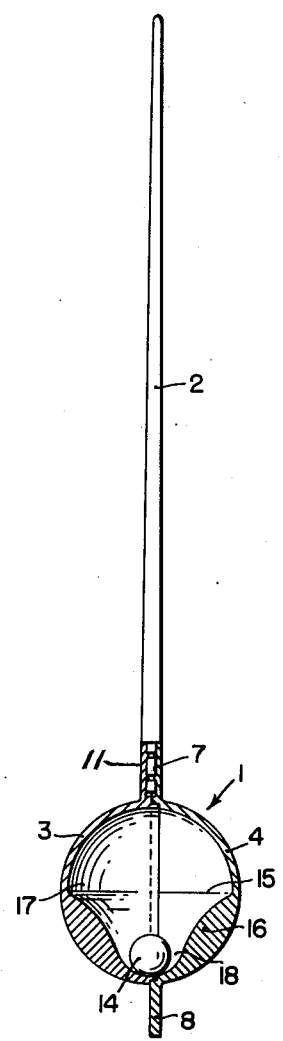
FIG. 2
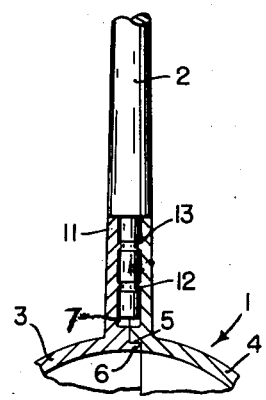
FIG. 4
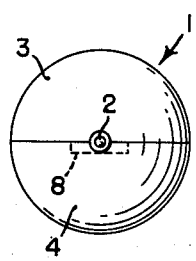
FIG. 3
INVENTOR.
F. A. LAMBACH
BY
Merrill M. Blackburn,
ATTORNEY Patented Aug. 19, 1952

2,607,153

UNITED STATES PATENT OFFICE 2,607,153

FISH BOBBER

Frederick A. Lambach, Omaha, Nebr., assignor to Air Light Products Co., Omaha, Nebr., a corporation of Nebraska Application October 19, 1950, Serial No. 191,052

2 Claims. (Cl. 43—43.1)

My invention relates to fishing tackle and particularly to fish bobbers and comprises among its objects the production of an improved fish bobber; the production of a bobber which will lie flat on the water until a fish bites and the parts of which bobber will then stand upright; the provision of a plastic bobber which is made up of a plurality of similar parts which are secured together to make a water-impervious whole; the production of a bobber which is provided with a quill which normally lies on the water, and then, when a fish bites, it will stand up erect; and such further objects, advantages, and capabilities as will hereafter appear and as are inherent in the structure disclosed herein.

In the drawings annexed hereto and forming a part hereof:

Fig. 1 is an elevation of a bobber construction in accordance with this invention;

Fig. 2 is a longitudinal section substantially along the plane indicated by the line 2—2 in Fig. 1;

Fig. 3 is a view, looking down upon the structure as shown in Fig. 1; and

Fig. 4 is an enlarged fragmentary section showing part of the structure as in Fig. 2.

Reference will now be made in greater detail to the annexed drawings for a more complete description of this invention. This bobber comprises a hollow sphere 1 and a quill 2. The sphere consists of a pair of hemispheres 3 and 4 having their edges so shaped that they can be secured together. One is grooved so that there is a flange 5 near the outer surface, and the other is shaped so that there is a flange 6 near the inner side. Consequently, the two hemispheres fit together, forming the hollow sphere 1. On the surface of this sphere is an ear 8 projecting therefrom, in the opposite direction from the quill 2, and this ear is formed with keyhole slots for the reception of a fish line whereby the line may be secured to one end of the float or bobber. The fish line is put through the keyhole 9 and next through the keyhole 10, with a half hitch around the quill on the opposite side of the sphere, or a double wrap around the keyhole slots 9 and 10 may be used. In the latter case, the fish line is inserted first in the slot 9, then in the slot 10, and around through the slots 9 and 10 again.

A stud 11, divided longitudinally in line with the division between the hemispheres, is secured to the hemispheres and is formed along its interior with ridges, as shown at 13, which mate with grooves in the quill, as shown at 12, thus securely holding the reduced end of the elongated quill 2 in the socket 7, extending down through the central part of the stud.

Inside of the hollow sphere is a ball 14 which rolls over into the channel 15, formed between a ridge 16 and a recess or depression 17, when the bobber is put into water. The weight of the quill causes the bobber to tip on its side in a horizontal position while the sinker is descending to its fixed depth and thus holds the float in its horizontal position with the ball 14 resting in the depression 17. If the line is fastened through the slots 9 and 10 and with a hitch around the quill, a slight pull on the line by the fisherman will tip the float and seat the ball in the depression 17. The ball 14 remains in the depression 17 and holds the quill horizontal in the water until the fishhook is taken by a fish. Then, when the fish pulls downwardly, the ear 8 is pulled beneath the surface of the water, and the quill starts to rise. This causes the ball 14 to roll over the ridge 16 into the recess or depression 18, causing the quill to stand upright so that the fisherman may know that he has a bite. With the line fastened through the slots 9 and 10 and a half hitch on the quill 2, a slight tug by the fisherman on the line will tip the float and cause the ball 14 to roll into the depression 17, resetting the float in a horizontal position.

It is of course understood that the specific description of structure set forth above may be departed from without departing from the spirit of this invention as disclosed in this specification and as defined by the appended claims.

Having now described my invention, I claim:

1. A fish bobber comprising a hollow body, a quill secured to said body and extending outwardly therefrom, a fish line receiving member extending outwardly from said body approximately at a point diametrically opposite to said quill, said body having a first ball-receiving recess in the interior thereof and located adjacent said line-receiving member and a second ball-receiving recess communicating with said first recess and separated therefrom by a ridge, and a ball rollable within said body, said ridge being rounded whereby said ball may be caused to shift from one of said recesses to the other by tipping said body from one position to another, said second ball-receiving recess being arranged relative to the center of gravity of the body so that the ball has a tendency to hold the quill approximately horizontal when the ball lies in said second ball-receiving recess, and to hold the quill approximately vertical when the ball lies in said first ball-receiving recess.

2. A fish bobber as defined by claim 1 in which said first ball-receiving recess is separated from the second ball-receiving recess by a ridge lying in a plane extending substantially normal to a line extending through the axis of the quill and through said ball-receiving recess, said ridge extending around the inside of the hollow body, the ridge holding the ball from rolling to the end of the bobber where the fish line-receiving member is located, except when the fish line receiving member is pulled downwardly, when the ball has a tendency to roll across the ridge and into the ball-receiving recess adjacent the fish line receiving member.

FREDERICK A. LAMBACH.

REFERENCES CITED

The following references are of record in the file of this patent:

UNITED STATES PATENTS

| Number | Name | Date |
|---|---|---|
| 395,900 | Hayes et al. | Jan. 8, 1889 |
| 441,447 | Stahl | Nov. 25, 1890 |
| 841,429 | Passage | Jan. 15, 1907 |
| 1,850,748 | Foster | Mar. 22, 1932 |
| 1,870,520 | Loehr | Aug. 9, 1932 |
| 2,226,331 | Allison | Dec. 24, 1940 |
| 2,270,487 | Withey | Jan. 20, 1942 |
| 2,322,241 | Kurz | June 22, 1943 |
| 2,326,510 | Worden | Aug. 10, 1943 |